July 14, 1936.  F. E. KIP  2,047,565
ROASTING APPARATUS
Filed Jan. 7, 1933  2 Sheets-Sheet 1
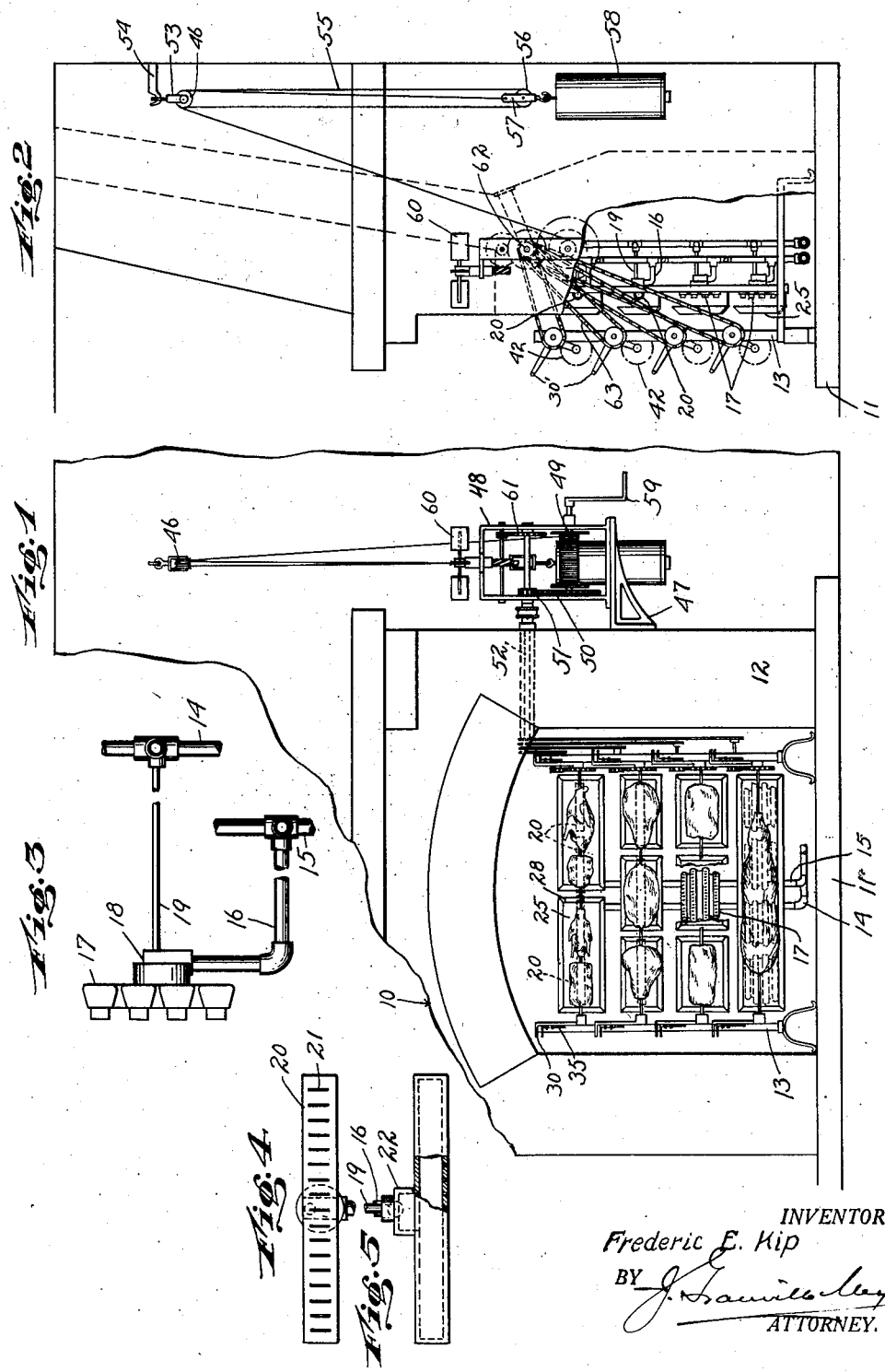
INVENTOR.
Frederic E. Kip
BY
ATTORNEY.

July 14, 1936.  F. E. KIP  2,047,565
ROASTING APPARATUS
Filed Jan. 7, 1933  2 Sheets-Sheet 2
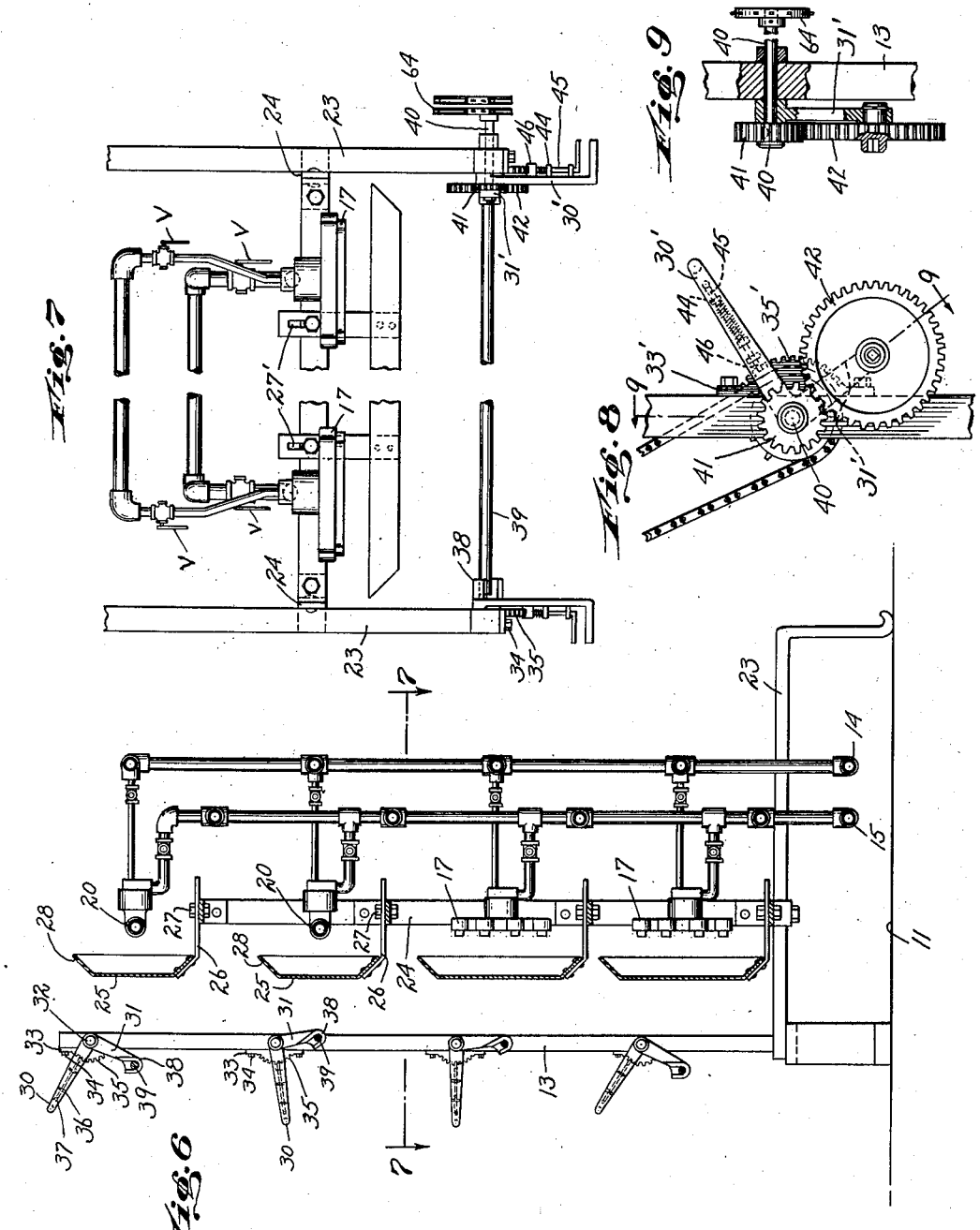
INVENTOR.
Frederic E. Kip
BY
ATTORNEY.

Patented July 14, 1936

2,047,565

UNITED STATES PATENT OFFICE 2,047,565

ROASTING APPARATUS

Frederic E. Kip, Montclair, N. J.

Application January 7, 1933, Serial No. 650,703

1 Claim. (Cl. 126—41)

My invention relates to roasting apparatus of the type wherein fowls, meats, etc., to be roasted are placed on spits and rotated in proximity to a source of heat.

Meats or fowls roasted on rotary spits are more tender and savory than those roasted in an oven. This is due to the fact that approximately one-third of the fowl or meat directly confronts the source of heat, while the other two-thirds are subjected to the cooler air, and, of course, since the spit is rotating the entire surface of the fowl or meat is continuously being subjected to the heat and cooler air in the foregoing manner. This continuous change produces a tenderness and flavor to the fowl or meat which it is impossible to obtain by roasting in an oven. The above manner of roasting is not new by any means and has been practiced in various countries on crude apparatus, wherein the spit was rotated by hand above a flaming fire, and in restaurants where the meat and fowl are rotated before an open grate coal fire.

The principal general object of my present invention is to provide a very intense source of heat in the nature of a sootless flame which can be regulated at will for roasting fowls and meats on a rotatable spit located near the source of heat, and to provide for mounting a plate between the flame and spit, if desired, whereby the plate will be heated by the flame to radiate heat to the fowl or meat.

Another object of the invention is to provide in conjunction with the foregoing, for relative adjustment of the plates and spits preferably by a special mounting for the spit or spits, whereby they may be moved relatively to the sootless flame or plates, so that the apparatus can handle various sized fowls and meats, and whereby the meats can be moved to or from the source of heat either before or during roasting.

Other objects and advantages of the invention will become apparent and will be particularly pointed out during the course of the following detailed description of the accompanying drawings, in which—

Fig. 1 is a front elevation of apparatus embodying the invention;

Fig. 2 is a side elevation of the structure shown in Fig. 1 with parts broken away;

Fig. 3 is a side elevation of a burner especially adapted for use in connection with the apparatus;

Fig. 4 is a front elevation of another type of burner;

Fig. 5 is a top plan view of the burner shown in Fig. 4 partly broken away;

Fig. 6 is a vertical sectional view showing the spit holders, heating plates, burners, and fuel and air conduits leading thereto;

Fig. 7 is a view on the line 7—7 of Fig. 6;

Fig. 8 is an enlarged fragmentary side elevation of the spit holder and adjusting means; and Fig. 9 is a view taken on the line 9—9 of Fig. 8.

In Fig. 1 the numeral 10 designates generally a fire place or portable structure simulating a fire place and comprising a hearth 11, side walls 12, between which on the hearth 11 are mounted standards 13, supporting the spits in a manner and by means hereinafter described. A pipe 15 leads from a source of gaseous or vaporous fuel supply and extends upwardly between the sides 12 above the hearth 11, and a similar pipe 14 connected to a source of compressed air, preferably a storage tank, from which air may be fed under an even and desirable pressure.

Referring for the moment to Fig. 3, it will be noted that the gas pipe 15 is connected by branch 16 to a burner 17, at the rear of which is a chamber 18 into which the branch 16 communicates. The pipe 14 is connected by branch 19 to the burner, the branch 16 extending through the back wall of the chamber 18 to feed compressed air into the chamber for admixture with the gas just prior to entrance of the air and gas into the burner 17. I preferably provide a plurality of burners 17, each of which has a plurality of jet openings. The burners 17 are of substantially oblong shape, and each is connected by leads such as 16 and 19 to the pipes 15 and 14. I may also provide burners of a different shape but connected in the same maner to the pipes 15 and 14 as shown in Figs. 4 and 5, wherein the burner 20 is shown of elongated cylindrical form and provided with a plurality of jet openings 21 at its front. At their backs the burners 20 also have chambers 22 into which branch pipes 16 and 19 communicate from the gas and air pipes 14 and 15, the same as in burners 17. Valves V are mounted preferably in each branch pipe.

In Fig. 6, I have shown the burners 20 arranged one above the other and the burners 17 arranged in the same manner in groups below the burners 20. In the same figure, it will be noted that the standards 13 which support the spits have a rearwardly extending arm 23 which supports frame 24 on which plates 25 are supported by brackets 26 bolted as at 27 to the frame 24, the brackets 26 preferably having slots 27' through which the bolts extend to afford adjustment of the plates relative to the burners. Each of the plates has a front wall and a tapering marginal flange 28, so that the sides of the plates 25 which confront the burners are dished, and it is into this dished portion or against the rear face of the plates 25 that the flames from the burners 20 are projected, the marginal flanges 28 confining the flames behind the plates.

In Fig. 1, I have shown the upper plates 25 as being relatively long and narrow and the burners therebehind would preferably be of the character shown in Fig. 4. These uppermost plates are designed especially for the roasting of small fowls or small cuts of meats. The plates which are in front of the burners 17, on the other hand, are relatively wide and especially designed for the roasting of larger fowls or cuts of meats. As shown in Fig. 1, the lowermost plate may extend almost entirely across the hearth between the standards 13 and have a plurality of burners therebehind, so that a long roast or even young animal may be disposed in front thereof for roasting.

The standards 13 are in alinement at opposite sides of the hearth, and at alined corresponding points on each is mounted a holder to receive one end of a spit. Referring to Fig. 6, which shows the standard at the left of the hearth shown in Fig. 1, it will be noted that a bell crank lever having a handle portion 30 and a shorter arm 31 is pivotally mounted on the stud or pin 32 on the standard. There is also provided adjacent the lever a plate 33 rigidly secured by bolts 34 to the standard, the plate having a ratchet area or edge 35 substantially concentric with the pivot 32. The handle 30 has eyes 36 on one side through which extends a rod 37, one end of which may engage with notches in the surface 35 to prevent the lever from rotating on the pivot 32. The arm 31 carries a cradle 38 to receive and rotatably support one end of the spit 39.

Referring to Fig. 8, the opposite upright 13 has a similar arrangement of bell crank lever with a handle 30', and a depending arm 31' through which the spit is journaled. This second bell crank lever is pivotally mounted around a shaft 40 which is operatively connected with the apparatus for rotating the spit in a manner hereinafter described in detail. A gear 41 is keyed to the shaft 40 for rotation therewith. The arm 31' of the bell crank lever has rotatably supported thereon a gear 42, the teeth of which mesh with the gear 41 and the axis of rotation of the gear 42 is concentric with the axis of the spit, so that the end of the spit may be keyed to the gear, or as is obvious, the gear 42 may be formed as a part of the spit rod. The bell crank lever is held in desired relation by an arrangement similar to that previously described and comprising loops 44 on the handle 30' through which the rod 45 is mounted. The rod 45 has an abutment 46 and a coil spring is mounted between one of the loops 44 in the abutment 46 to normally urge the rod 45 toward the segment plate 33', so that the end of the rod will engage in the notches in the rack face 35' of the segment.

When it is desired to move the spit nearer to or away from the plates 28 the ends of the rods 37 and 45 are grasped and pulled toward the ends of the handles 30, 30', until the ends of the rods are released from engagement in the notches on the segments. Then the bell crank lever can be swung on the pivots 32, 40, to rotate the bell cranks and bring the spit nearer to or away from the plates 28. The spit, of course, moves with the bell crank levers, so that the adjustment can be made during a roasting operation.

While any suitable mechanism may be used for rotating the spits, I have shown an old type in the nature of a weight motor at one side of the hearth and which may be mounted on a bracket 47. The weight motor shown is of known construction and comprises a frame 48 which rests on the bracket 47, the frame rotatably supporting a drum 49 which is connected with a gear wheel 50 meshing with a gear wheel 51, to drive or rotate shaft 52 extending through the side wall 12. A block and double pulley 53 is supported on a bracket 54 remote from the frame 42. A rope or cable 55 is attached at one end to the drum 49 and passes over one of the pulleys 46 then under a runner pulley 56 and over the other of the pulleys 46. The free end of the rope 55 is connected to the block 57 which carries the runner pulley 56 and also supports the weight 58. The drum may be rotated by the crank handle 59 to wind the rope thereon, and, of course, after the rope has been wound the weight has been raised so that in descending it pulls on the rope and the drum will be rotated in the opposite direction, the rate of rotation being controlled by the governor 60 and gears 61 and load on the shaft 52. The other end of the shaft 52 which is thus rotated has keyed thereto sprocket wheels 62 over which are trained the sprocket chains 63, and each of the chains 63 is also trained over a wheel 64, there being one wheel 64 connected to each of the shafts 40, so that the shaft will be rotated to also rotate the gears 41 and 42 and consequently the spits.

I have shown and described generally the weight motor, because the same is a simple and attractive means for rotating the spits and could well be used where an antique appearance is desired. Obviously though, the shaft 52 can be driven by an electric motor, but regardless of the manner of driving the shaft 52 my invention would not be affected since it resides in the provision of an intense flame adjacent which the spits are rotated. Making the plates 28 adjustable to or from the burners as by means of the slots 27' in the arms 26 is optional, and it is not essential to the practice of the invention in all of its features to have the spits adjustable with respect to the plates, but I deem it highly desirable.

In connection with the adjustability of the position of the spits, so far as I am aware, I am the first person to have provided the mechanical means for so adjusting the spits, and furthermore, of so providing for the adjustment that when the spits are moved there will be no slack in the driving connections. This is due to the fact that the driving connection is with the gear 41, while the gears 42 which drive the spits are adjustable with respect to the fixed gears 41 in the manner above described.

In actual practice, I have found that the burner having the gas and compressed air fed thereto in the manner shown and described with the air under a constant and even pressure, affords a very clean and hot flame of great length. This arrangement is more particularly described in my co-pending application, Ser. No. 402,058 filed October 24, 1929, patented Feb. 20, 1934, No. 1,948,221. The combustion is so perfect that there is a very clean flame and no soot. Furthermore, since the flame can be regulated by the valve V, my herein disclosed invention may be practiced if desired without the plates 25. In Fig. 1, one of the plates is shown broken away and if this, or any, or all of the plates were omitted the spits would be adjustably supported directly in front of burners capable of producing a very clean, hot, regulatable flame.

Therefore, with the plates 25 or without said plates; I can completely roast the meat or fowl in a comparatively short time under the process known as spit roasting and obtain a tenderness and flavor impossible with oven roasting.

I claim:

In roasting apparatus of the character described, a plurality of burners each having a plurality of jet openings and a mixing chamber communicating directly with the burner, a standard, a vertical frame supported thereby, a plate arranged in front of each of the burners and supported in substantially vertical position on said frame with one surface thereof confronting the jet openings of the burner, spits rotatably supported on said standard, one adjacent the other surface of each of the plates, means for adjusting the spits relative to the plates, means for adjusting the plates relative to the burners, and gas and compressed air conduits having manually operable valves therein leading into each of the mixing chambers.

FREDERIC E. KIP.